US012664050B2

(12) United States Patent
Ayyapureddi

(10) Patent No.: US 12,664,050 B2
(45) Date of Patent: Jun. 23, 2026

(54) APPARATUSES AND METHODS FOR ALTERNATE MEMORY DIE METADATA STORAGE

(71) Applicant: MICRON TECHNOLOGY, INC., Boise, ID (US)

(72) Inventor: Sujeet Ayyapureddi, Boise, ID (US)

(73) Assignee: MICRON TECHNOLOGY, INC., Boise, ID (US)

( * ) Notice: Subject to any disclaimer, the term of this patent is extended or adjusted under 35 U.S.C. 154(b) by 21 days.

(21) Appl. No.: 18/747,676

(22) Filed: Jun. 19, 2024

(65) Prior Publication Data

US 2025/0110830 A1       Apr. 3, 2025

Related U.S. Application Data

(60) Provisional application No. 63/587,500, filed on Oct. 3, 2023.

(51) Int. Cl.
*G06F 11/10*       (2006.01)
*G06F 13/16*       (2006.01)

(52) U.S. Cl.
CPC ...... *G06F 11/1072* (2013.01); *G06F 11/1004* (2013.01); *G06F 13/1668* (2013.01)

(58) Field of Classification Search
None
See application file for complete search history.

(56) References Cited

U.S. PATENT DOCUMENTS 5,177,705 A       1/1993   Mcelroy et al.
5,299,164 A       3/1994   Takeuchi et al.

5,434,814 A       7/1995   Cho et al.
6,249,476 B1       6/2001   Yamazaki et al.
7,117,421 B1      10/2006   Danilak
8,891,313 B2      11/2014   Chang et al.
9,158,617 B2      10/2015   Cho et al.
9,195,537 B2      11/2015   Sharon et al.
9,201,728 B2      12/2015   Patapoutian et al.
9,361,960 B2       6/2016   Vogelsang
9,547,550 B1       1/2017   Thakore et al.
(Continued)

FOREIGN PATENT DOCUMENTS

WO       2016048634 A1       3/2016
WO       2024107367 A1       5/2024
(Continued)

OTHER PUBLICATIONS

Chen et al., "CATCAM: Constant-time Alteration Ternary CAM with Scalable In-Memory Architecture"; 2020 53rd Annual IEEE/ACM International Symposium on Microarchitecture (MICRO), Athens, Green; Oct. 17-21, 2020; pp. 342-355.
(Continued)

*Primary Examiner* — Daniel F. McMahon

(74) *Attorney, Agent, or Firm* — Dorsey & Whitney LLP

(57)       ABSTRACT

Apparatuses, systems, and methods for alternate memory die metadata storage. A memory module includes a number of memory devices. A controller writes data and metadata to the module. The data is stored in the memory devices, while the metadata is stored in a selected portion of the memory devices. The selected portion of the memory devices may use separate write enable signals to protect bit lines which the metadata is not being written to.

22 Claims, 6 Drawing Sheets

(56) References Cited

U.S. PATENT DOCUMENTS

| | | | |
|---|---|---|---|
| 9,607,679 | B1 | 3/2017 | Kim et al. |
| 9,666,291 | B2 | 5/2017 | Park |
| 9,880,901 | B2 | 1/2018 | Zastrow |
| 9,996,799 | B2 | 6/2018 | Bostick et al. |
| 10,127,101 | B2 | 11/2018 | Halbert et al. |
| 10,222,989 | B1 | 3/2019 | Zitlaw |
| 10,243,590 | B1 | 3/2019 | Seshadri |
| 10,810,079 | B2 | 10/2020 | Halbert et al. |
| 10,817,371 | B2 | 10/2020 | Rooney et al. |
| 10,872,011 | B2 | 12/2020 | Bains et al. |
| 10,929,033 | B2 | 2/2021 | Meeker et al. |
| 10,937,517 | B1 | 3/2021 | Rich-Plotkin et al. |
| 10,963,336 | B2 | 3/2021 | Veches |
| 11,010,304 | B2 | 5/2021 | Kang et al. |
| 11,074,126 | B2 | 7/2021 | Prather et al. |
| 11,088,710 | B2 | 8/2021 | Lee et al. |
| 11,177,012 | B1 | 11/2021 | Avraham et al. |
| 11,200,961 | B1 | 12/2021 | Uribe |
| 11,264,085 | B1 | 3/2022 | Ware et al. |
| 11,538,515 | B2 | 12/2022 | Ji et al. |
| 11,579,971 | B2 | 2/2023 | Ayyapureddi |
| 11,580,038 | B2 | 2/2023 | Norman et al. |
| 11,615,861 | B2 | 3/2023 | Kim et al. |
| 11,830,570 | B2 | 11/2023 | Laurent et al. |
| 11,837,316 | B1 | 12/2023 | Smith et al. |
| 12,001,707 | B2 | 6/2024 | Boehm et al. |
| 12,014,797 | B2 | 6/2024 | Ayyapureddi |
| 12,019,513 | B2 | 6/2024 | Ayyapureddi |
| 12,095,474 | B1 | 9/2024 | Zhu et al. |
| 12,204,410 | B2 * | 1/2025 | Sutera .................. G06F 11/1048 |
| 12,204,770 | B2 | 1/2025 | Ayyapureddi |
| 12,230,347 | B2 | 2/2025 | Suh et al. |
| 12,249,393 | B2 | 3/2025 | Reohr |
| 12,299,291 | B2 | 5/2025 | Eilert et al. |
| 12,475,965 | B2 | 11/2025 | Smith et al. |
| 12,488,853 | B2 | 12/2025 | Smith et al. |
| 12,511,191 | B2 | 12/2025 | Ayyapureddi et al. |
| 12,512,176 | B2 | 12/2025 | Smith et al. |
| 12,524,298 | B2 | 1/2026 | Ayyapureddi |
| 12,524,306 | B2 | 1/2026 | Ayyapureddi |
| 12,530,261 | B2 | 1/2026 | Ayyapureddi et al. |
| 12,536,096 | B2 | 1/2026 | Ayyapureddi |
| 12,541,425 | B2 | 2/2026 | Ayyapureddi et al. |
| 12,541,429 | B2 | 2/2026 | Ayyapureddi |
| 2003/0081492 | A1 | 5/2003 | Farrell et al. |
| 2003/0117838 | A1 | 6/2003 | Hidaka |
| 2006/0233030 | A1 | 10/2006 | Choi |
| 2008/0089129 | A1 | 4/2008 | Lee |
| 2008/0313493 | A1 | 12/2008 | Roohparvar et al. |
| 2009/0097348 | A1 | 4/2009 | Minzoni et al. |
| 2009/0132876 | A1 | 5/2009 | Freking et al. |
| 2009/0168523 | A1 | 7/2009 | Shirakawa et al. |
| 2009/0196103 | A1 | 8/2009 | Kim et al. |
| 2010/0177582 | A1 | 7/2010 | Kim et al. |
| 2010/0177587 | A1 | 7/2010 | Huang |
| 2010/0290146 | A1 | 11/2010 | Lam |
| 2011/0154158 | A1 | 6/2011 | Yurzola et al. |
| 2012/0092940 | A1 | 4/2012 | Chang et al. |
| 2013/0117630 | A1 | 5/2013 | Kang |
| 2013/0275709 | A1 | 10/2013 | Gajapathy |
| 2014/0126300 | A1 | 5/2014 | Takahashi et al. |
| 2015/0193464 | A1 | 7/2015 | Kwon et al. |
| 2015/0262631 | A1 | 9/2015 | Shimizu |
| 2016/0070507 | A1 | 3/2016 | Hoshikawa et al. |
| 2016/0092307 | A1 | 3/2016 | Bonen et al. |
| 2016/0125920 | A1 | 5/2016 | Kim et al. |
| 2016/0307645 | A1 | 10/2016 | Kim et al. |
| 2017/0060681 | A1 | 3/2017 | Halbert et al. |
| 2017/0062067 | A1 | 3/2017 | Yang et al. |
| 2017/0091025 | A1 | 3/2017 | Ahn et al. |
| 2017/0192843 | A1 | 7/2017 | Warnes et al. |
| 2017/0249097 | A1 | 8/2017 | Eguchi |
| 2017/0269992 | A1 | 9/2017 | Bandic et al. |
| 2017/0285990 | A1 | 10/2017 | Chen et al. |
| 2017/0286213 | A1 * | 10/2017 | Li ........................ G06F 3/0611 |

| | | | |
|---|---|---|---|
| 2017/0344423 | A1 | 11/2017 | Hsiao et al. |
| 2018/0025760 | A1 | 1/2018 | Mazumder et al. |
| 2018/0121283 | A1 | 5/2018 | Plants |
| 2018/0150350 | A1 | 5/2018 | Cha et al. |
| 2018/0301203 | A1 | 10/2018 | Kim |
| 2019/0066816 | A1 | 2/2019 | Dono |
| 2019/0073261 | A1 | 3/2019 | Halbert et al. |
| 2019/0103154 | A1 | 4/2019 | Cox et al. |
| 2019/0197171 | A1 | 6/2019 | Tiwari et al. |
| 2019/0206478 | A1 | 7/2019 | Jun |
| 2019/0362792 | A1 | 11/2019 | Oh et al. |
| 2019/0369893 | A1 | 12/2019 | Ross |
| 2019/0371403 | A1 | 12/2019 | Maejima |
| 2020/0019462 | A1 | 1/2020 | Prather et al. |
| 2020/0051616 | A1 | 2/2020 | Cho |
| 2020/0104205 | A1 | 4/2020 | Noguchi et al. |
| 2020/0104208 | A1 | 4/2020 | Heo et al. |
| 2020/0194050 | A1 | 6/2020 | Akamatsu |
| 2020/0226039 | A1 | 7/2020 | Lee |
| 2020/0321060 | A1 | 10/2020 | Lang et al. |
| 2020/0373941 | A1 | 11/2020 | Latorre et al. |
| 2021/0011645 | A1 | 1/2021 | Martinelli et al. |
| 2021/0012817 | A1 | 1/2021 | Laurent et al. |
| 2021/0012849 | A1 | 1/2021 | Kim et al. |
| 2021/0057003 | A1 | 2/2021 | Prather et al. |
| 2021/0064119 | A1 | 3/2021 | Mirichigni et al. |
| 2021/0064282 | A1 | 3/2021 | He et al. |
| 2021/0064461 | A1 | 3/2021 | Veches |
| 2021/0064467 | A1 * | 3/2021 | Buerkle .............. G06F 11/1076 |
| 2021/0083687 | A1 | 3/2021 | Lee et al. |
| 2021/0142848 | A1 | 5/2021 | Lim et al. |
| 2021/0142860 | A1 | 5/2021 | Song et al. |
| 2021/0200630 | A1 | 7/2021 | Ishikawa et al. |
| 2021/0208967 | A1 | 7/2021 | Cha et al. |
| 2021/0224155 | A1 | 7/2021 | Bains et al. |
| 2021/0247910 | A1 | 8/2021 | Kim et al. |
| 2021/0272627 | A1 | 9/2021 | Lee |
| 2021/0294692 | A1 | 9/2021 | Chen |
| 2021/0311821 | A1 | 10/2021 | Ryu et al. |
| 2021/0311822 | A1 | 10/2021 | Jannusch et al. |
| 2021/0311830 | A1 | 10/2021 | Lee |
| 2021/0357287 | A1 | 11/2021 | Kim et al. |
| 2021/0358559 | A1 | 11/2021 | Suh et al. |
| 2021/0365316 | A1 | 11/2021 | Nale et al. |
| 2021/0406123 | A1 | 12/2021 | Nakanishi et al. |
| 2022/0027090 | A1 | 1/2022 | Kwon et al. |
| 2022/0035529 | A1 | 2/2022 | Bennett |
| 2022/0084565 | A1 | 3/2022 | Prather et al. |
| 2022/0091938 | A1 | 3/2022 | Buerkle et al. |
| 2022/0129196 | A1 | 4/2022 | Roberts et al. |
| 2022/0138065 | A1 * | 5/2022 | Secatch .................. G06F 3/0679 |
| | | | 714/6.12 |
| 2022/0197739 | A1 | 6/2022 | Ryu et al. |
| 2022/0261310 | A1 | 8/2022 | Ishikawa et al. |
| 2022/0334917 | A1 | 10/2022 | Veches |
| 2022/0337271 | A1 | 10/2022 | Hanna |
| 2022/0365692 | A1 | 11/2022 | Vankamamidi et al. |
| 2022/0398042 | A1 | 12/2022 | Song et al. |
| 2022/0415398 | A1 | 12/2022 | Lien et al. |
| 2023/0009642 | A1 | 1/2023 | Eilert et al. |
| 2023/0146549 | A1 | 5/2023 | Lien et al. |
| 2023/0161665 | A1 | 5/2023 | Choi et al. |
| 2023/0185665 | A1 | 6/2023 | Ayyapureddi |
| 2023/0223096 | A1 | 7/2023 | Bains et al. |
| 2023/0236747 | A1 | 7/2023 | Curewitz et al. |
| 2023/0289072 | A1 | 9/2023 | Cho et al. |
| 2023/0298682 | A1 | 9/2023 | Suh et al. |
| 2023/0350581 | A1 | 11/2023 | Ayyapureddi |
| 2023/0350748 | A1 | 11/2023 | Ayyapureddi |
| 2023/0352064 | A1 | 11/2023 | Ayyapureddi |
| 2023/0352112 | A1 | 11/2023 | Ayyapureddi |
| 2024/0004754 | A1 * | 1/2024 | Veches ................ G06F 11/1072 |
| 2024/0029781 | A1 | 1/2024 | Schreck et al. |
| 2024/0079074 | A1 | 3/2024 | Bak et al. |
| 2024/0086520 | A1 | 3/2024 | Kaplan et al. |
| 2024/0096404 | A1 | 3/2024 | Cho et al. |
| 2024/0126438 | A1 | 4/2024 | Suh et al. |
| 2024/0160351 | A1 | 5/2024 | Ayyapureddi et al. |
| 2024/0160524 | A1 | 5/2024 | Ayyapureddi et al. |

(56)                    References Cited

U.S. PATENT DOCUMENTS

| 2024/0160527 A1 | 5/2024 | Ayyapureddi et al. |
| 2024/0161855 A1 | 5/2024 | Smith et al. |
| 2024/0161856 A1 | 5/2024 | Smith et al. |
| 2024/0161859 A1 | 5/2024 | Ayyapureddi et al. |
| 2024/0170088 A1 | 5/2024 | Smith et al. |
| 2024/0176699 A1 | 5/2024 | Ayyapureddi et al. |
| 2024/0177794 A1 | 5/2024 | Vogelsang |
| 2024/0220142 A1 | 7/2024 | Park |
| 2024/0220149 A1 | 7/2024 | Kim et al. |
| 2024/0248796 A1 | 7/2024 | Ayyapureddi |
| 2024/0256380 A1 | 8/2024 | Ayyapureddi |
| 2024/0256382 A1 | 8/2024 | Ayyapureddi |
| 2024/0272979 A1 | 8/2024 | Ayyapureddi |
| 2024/0272984 A1 | 8/2024 | Ayyapureddi |
| 2024/0273014 A1 | 8/2024 | Ayyapureddi |
| 2024/0274223 A1 | 8/2024 | Ayyapureddi |
| 2024/0281327 A1 | 8/2024 | Ayyapureddi et al. |
| 2024/0289266 A1 | 8/2024 | Ayyapureddi |
| 2024/0321328 A1 | 9/2024 | Ayyapureddi |
| 2024/0377952 A1 | 11/2024 | Song et al. |
| 2024/0394178 A1* | 11/2024 | Partsch .................. G11C 7/10 |
| 2024/0419538 A1 | 12/2024 | Huang et al. |
| 2025/0077103 A1 | 3/2025 | Ayyapureddi |
| 2025/0077424 A1 | 3/2025 | Ayyapureddi |
| 2025/0078906 A1 | 3/2025 | Kim et al. |
| 2025/0078949 A1 | 3/2025 | Ayyapureddi |
| 2025/0078950 A1 | 3/2025 | Ayyapureddi |
| 2025/0110643 A1 | 4/2025 | Ayyapureddi |
| 2025/0110825 A1 | 4/2025 | Ayyapureddi |
| 2025/0111887 A1 | 4/2025 | Ayyapureddi |
| 2025/0112643 A1 | 4/2025 | Ayyapureddi |
| 2025/0123924 A1 | 4/2025 | Ayyapureddi et al. |
| 2025/0138940 A1 | 5/2025 | Cho et al. |
| 2025/0156087 A1 | 5/2025 | Ayyapureddi |
| 2025/0165160 A1 | 5/2025 | Eilert et al. |

FOREIGN PATENT DOCUMENTS

| WO | 2024107503 A1 | 5/2024 |
| WO | 2024107504 A1 | 5/2024 |
| WO | 2024167711 A1 | 8/2024 |
| WO | 2025053912 A1 | 3/2025 |
| WO | 2025075696 A1 | 4/2025 |
| WO | 2025075697 A1 | 4/2025 |

OTHER PUBLICATIONS

J. F. Philippe Marchand "An Alterable Programmable Logic Array"; IEEE Journal of Solid-State Circuits, vol. sc-20, No. 5, Oct. 1985; pp. 1061-1066.
U.S. Appl. No. 19/025,934, titled "Apparatuses, Systems, and Methods for Managing Metadata Security and Access" filed Jan. 16, 2025, pp. all pages of application as filed.
PCT Application No. PCT/US24/39192 titled "Apparatuses and Methods for Scalable 1-Pass Error Correction Code Operations" filed Jul. 23, 2024, pp. all pages of the application as filed.
PCT Application No. PCT/US24/39195 titled "Apparatuses and Methods for Half-Page Modes of Memory Devices" filed Jul. 23, 2024, pp. all pages of the application as filed.
PCT Application No. PCT/US24/39231 titled "Apparatuses and Methods for Granular Single-Pass Metadata Access Operations" filed Jul. 24, 2024, pp. all pages of the application as filed.
Lumenci Team "High Bandwidth Memory (HBM3)" https://lumenci.com/blogs/high-bandwidth-memory; Editorial Team at Lumenci, Jul. 14, 2022; pp. 1-3.
U.S. Appl. No. 18/745,877 titled "Apparatuses and Methods for Half-Page Modes of Memory Devices" filed Jun. 17, 2024, pp. all pages of the application as filed.
U.S. Appl. No. 18/745,894 titled "Apparatuses and Methods for Half-Page Modes of Memory Devices" filed Jun. 17, 2024, pp. all pages of the application as filed.

U.S. Appl. No. 18/747,658, titled "Apparatuses and Methods for Bounded Fault Compliant Metadata Storage" filed Jun. 19, 2024, pp. all pages of application as filed.
U.S. Appl. No. 18/747,696, titled "Apparatuses and Methods for Scalable 1-Pass Error Correction Code Operations", filed Jun. 19, 2024, pp. all pages of application as filed.
U.S. Appl. No. 18/747,712, titled "Apparatuses and Methods for Granular Single-Pass Metadata Access Operations" filed Jun. 19, 2024, pp. all pages of application as filed.
U.S. Appl. No. 18/747,635, titled "Apparatuses and Methods for Read/Modify/Write Single-Pass Metadata Access Operations" filed Jun. 19, 2024, pp. all pages of application as filed.
U.S. Appl. No. 17/730,381, titled "Apparatuses, Systems, and Methods for Per Row Error Scrub Information", filed Apr. 27, 2022; pp. all pages of application as filed.
U.S. Appl. No. 17/730,396, titled "Apparatuses, Systems, and Methods for Per Row Error Scrub Information Registers", filed Apr. 27, 2022; pp. all pages of application as filed.
U.S. Appl. No. 17/731,024, titled "Apparatuses, Systems, and Methods for Managing Metadata Storage at a Memory", filed Apr. 27, 2022; pp. all pages of the application as filed.
U.S. Appl. No. 18/424,282 titled "Apparatuses and Methods for Bounded Fault Compliant Metadata Storage" filed Jan. 26, 2024; pp. all pages of application as filed.
U.S. Appl. No. 18/424,342 titled "Apparatuses and Methods for Bounded Fault Compliant Metadata Storage" filed Jan. 26, 2024; pp. all pages of application as filed.
U.S. Appl. No. 18/430,381, titled "Apparatuses, Systems, and Methods for Storing Memory Metadata", filed Feb. 1, 2024; pp. all pages of application as filed.
U.S. Appl. No. 18/430,406, titled "Apparatuses, Systems, and Methods for Storing Memory Metadata", filed Feb. 1, 2024; pp. all pages of application as filed.
U.S. Appl. No. 18/431,232, titled "Apparatuses, Systems, and Methods for Storing Memory Metadata", filed Feb. 2, 2024; pp. all pages of application as filed.
U.S. Appl. No. 18/431,306, titled "Apparatuses, Systems, and Methods for Storing Memory Metadata", filed Feb. 2, 2024; pp. all pages of application as filed.
U.S. Appl. No. 18/441,775 titled "Apparatuses and Methods for Settings for Adjustable Write Timing" filed Feb. 14, 2024, pp. all pages of the application as filed.
U.S. Appl. No. 18/441,830 titled "Apparatuses, Systems, and Methods for Storing and Accessing Memory Metadata and Error Correction Code Data" filed Feb. 14, 2024, pp. all pages of the application as filed.
U.S. Appl. No. 18/504,215 titled "Apparatuses and Methods for Enhanced Metadata Support" filed Nov. 8, 2023; pp. all pages of application as filed.
U.S. Appl. No. 18/504,234 titled "Apparatuses and Methods for Enhanced Metadata Support" filed Nov. 8, 2023; pp. all pages of application as filed.
U.S. Appl. No. 18/504,302 titled "Apparatuses and Methods for Configurable ECC Modes" filed Nov. 8, 2023; pp. all pages of application as filed.
U.S. Appl. No. 18/504,316 titled "Apparatuses and Methods for Configurable ECC Modes" filed Nov. 8, 2023; all pages of application as filed.
U.S. Appl. No. 18/504,324 titled "Apparatuses and Methods for Single-Pass Access of ECC Information, Metadata Information or Combinations Thereof" filed Nov. 8, 2023, all pages of application as filed.
U.S. Appl. No. 18/504,342 titled "Apparatuses and Methods for Single-Pass Access of ECC Information, Metadata Information or Combinations Thereof" filed Nov. 8, 2023; pp. all pages of application as filed.
U.S. Appl. No. 18/504,353 titled "Apparatuses and Methods for Separate Write Enable for Single-Pass Access of Data, Metadata, and Parity Information" filed Nov. 8, 2023; pp. all pages of application as filed.

(56)        References Cited

OTHER PUBLICATIONS

U.S. Appl. No. 18/504,362 titled "Apparatuses and Methods for Separate Write Enable for Single-Pass Access of Data, Metadata, and Parity Information" filed Nov. 8, 2023; pp. all pages of application as filed.
U.S. Appl. No. 18/625,539, titled "Apparatuses, Systems, and Methods for Per Row Error Scrub Information" filed Apr. 3, 2024, pp. all pages of application as filed.
U.S. Appl. No. 18/734,189, titled "Apparatuses, Systems, and Methods for Managing Metadata Storage at a Memory" filed Jun. 5, 2024, pp. all pages of application as filed.
U.S. Appl. No. 18/743,994 titled "Apparatuses and Methods for Shared Codeword in 2-Pass Access Operations" filed Jun. 14, 2024, pp. all pages of the application as filed.
U.S. Appl. No. 18/745,577 titled "Apparatuses and Methods for Half-Page Modes of Memory Devices" filed Jun. 17, 2024, pp. all pages of the application as filed.
U.S. Appl. No. 18/745,843 titled "Apparatuses and Methods for Half-Page Modes of Memory Devices" filed Jun. 17, 2024, pp. all pages of the application as filed.
U.S. Appl. No. 17/730,992 titled "Apparatuses, Systems, and Methods for Managing Metadata Security and Access" filed Apr. 27, 2022, pp. all pages of application as filed.
U.S. Appl. No. 19/360,159 titled "Apparatuses and Methods for Enhanced Metadata Support" filed Oct. 16, 2025; pp. all pages of the application as filed.
U.S. Appl. No. 19/366,908 titled "Apparatuses and Methods for Configurable ECC Modes", filed Oct. 23, 2025; pp. all pages of application as filed.
U.S. Appl. No. 19/376,027 titled "Apparatuses and Methods for Single-Pass Access of ECC Information, Metadata Information or Combinations Thereof", filed Oct. 31, 2025; pp. all pages of application as filed.
U.S. Appl. No. 19/381,448 titled "Apparatuses and Methods for Enhanced Metadata Support", filed Nov. 6, 2025; pp. all pages of application as filed.
U.S. Appl. No. 19/431,541, titled "Apparatuses And Methods For Bounded Fault Compliant Metadata Storage" filed Dec. 23, 2025, pp. all pages of application as filed.
U.S. Appl. No. 19/435,124 titled "Apparatuses, Systems, and Methods for Storing Memory Metadata", filed Dec. 29, 2025; pp. all page of the application as filed.
U.S. Appl. No. 19/441,648, titled "Apparatuses, Systems, and Methods for Storing and Accessing Memory Metadata and Error Correction Code Data" filed Jan. 6, 2026; pp. all pages of application as filed.
Handy, Jim, "Emerging Memories Today: Understanding Bit Selectors", The Memory Guy Blog, Objective Analysis on Semiconductor Memories, Nov. 2018, 5 pgs.

* cited by examiner

600

610

Receiving a Plurality of Data Bits and an Associated Plurality of Metadata Bits with a Memory Module Comprising a Plurality of Memory Devices

620

Writing a Respective Portion of the Plurality of Data Bits to each of the Plurality of Memory Devices

630

Writing a Respective Portion of the Plurality of Metadata Bits to Selected Ones of the Plurality of Memory Devices

APPARATUSES AND METHODS FOR ALTERNATE MEMORY DIE METADATA STORAGE

CROSS REFERENCE TO RELATED APPLICATION(S)

This application claims the benefit under 35 U.S.C. § 119 of the earlier filing date of U.S. Provisional Application Ser. No. 63/587,500 filed Oct. 3, 2023 the entire contents of which is hereby incorporated by reference in its entirety for any purpose.

BACKGROUND

This disclosure relates generally to semiconductor devices, and more specifically to semiconductor memory devices. In particular, the disclosure relates to volatile memory, such as dynamic random access memory (DRAM). Information may be stored on individual memory cells of the memory as a physical signal (e.g., a charge on a capacitive element). During an access operation, an access command may be received along with address information which specifies which memory cells should be accessed. Memory devices may be packaged together onto a module, and the module may have error correction capabilities for at least some of the information stored on the memory device.

There is a growing interest in enabling the memory to store information in the module which is associated with pieces of data. For example, error correction information and/or metadata may be stored in the array along with their associated data. Memory modules may be capable of correcting certain sets of information. There may be a need to ensure that when metadata is used, the metadata is stored in such a way that it remains compatible with the module's correction capabilities without unduly impacting the performance of the module.

DETAILED DESCRIPTION

Figure 1:
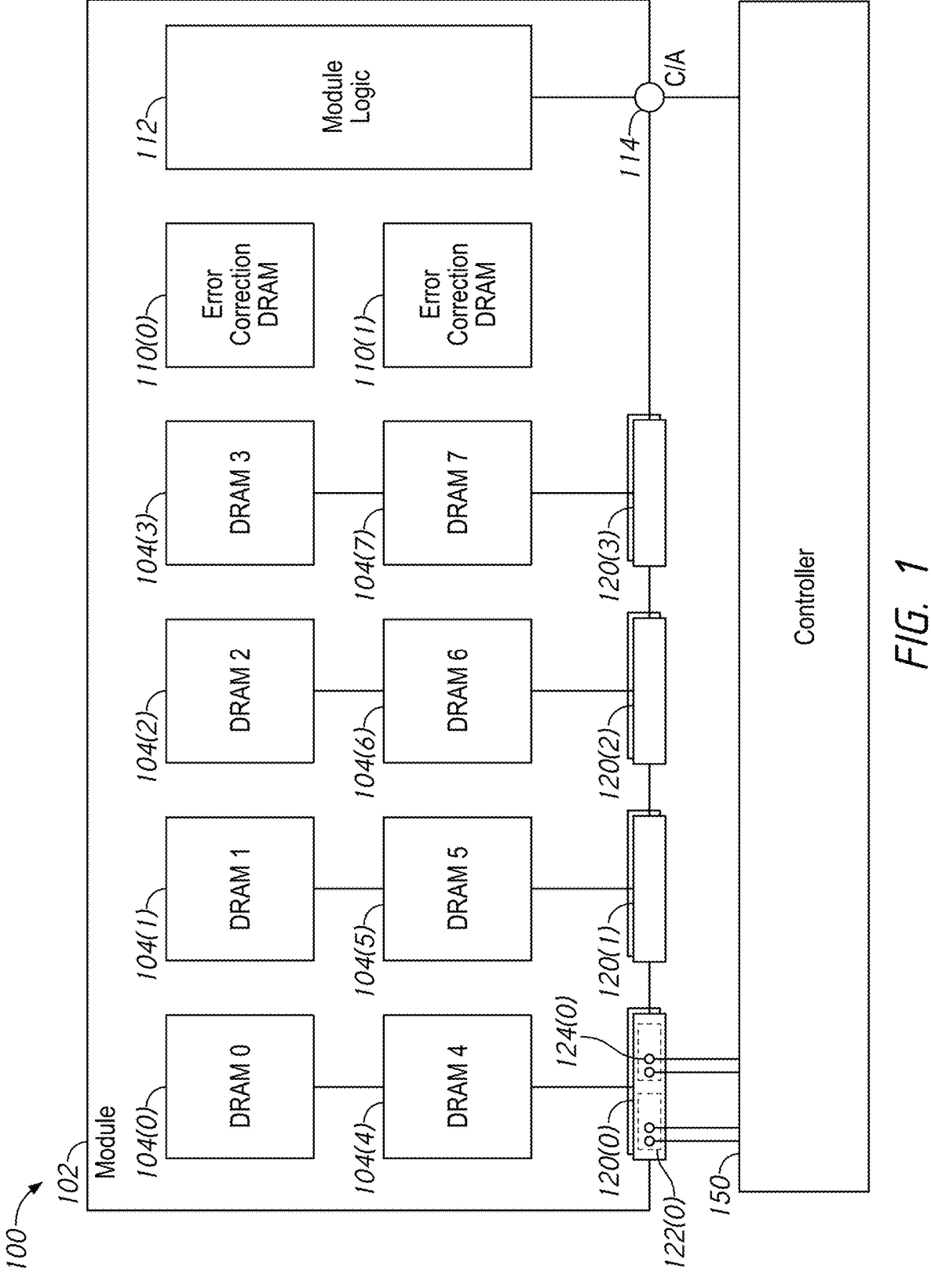
FIG. 1 is a block diagram of a memory system according to some embodiments of the present disclosure.

The following description of certain embodiments is merely exemplary in nature and is in no way intended to limit the scope of the disclosure or its applications or uses. In the following detailed description of embodiments of the present systems and methods, reference is made to the accompanying drawings which form a part hereof, and which are shown by way of illustration specific embodiments in which the described systems and methods may be practiced. These embodiments are described in sufficient detail to enable those skilled in the art to practice presently disclosed systems and methods, and it is to be understood that other embodiments may be utilized and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The following detailed description is therefore not to be taken in a limiting sense, and the scope of the disclosure is defined only by the appended claims.

Memory arrays may generally include a number of memory cells arranged at the intersection of word lines (rows) and bit lines/digit lines (columns). The columns may be grouped together into column planes, and a column select (CS) signal may be used to select a set of columns within each of the active column planes to provide data. When an access command is received, the memory may prefetch a codeword (e.g., a number of bits of data) along with one or more associated bits from the memory and either replace the prefetched data with new data (e.g., as part of a write operation) or provide the prefetched data off the memory device (e.g., as part of a read operation).

Memory devices may store additional information which is associated with each codeword. For example, the additional information may include parity bits which are used as part of an error correction scheme, metadata which includes information about the data codeword (or is a portion of information about a larger set of data which includes the codeword), or combinations thereof.

As used herein, the term data may represent any bits of information that the controller wishes to store and/or retrieve from the memory. The term metadata may represent any bits of information about the data which the controller writes to and/or receives from the memory. For example, the metadata may be information that the controller generates about the data, about how or where the data memory is stored in the memory, about how many errors have been detected in the data, etc. The data and the metadata together represent information written to the memory by a controller and then also read from the memory by the controller, with the data and metadata differing in content and how they are generated in that the metadata is based on information about the data. The term parity may represent any bits generated by an error correction circuit of the memory based on the data, metadata, or combinations thereof. The parity may generally stay within the memory. In some embodiments, the amount of data and/or metadata retrieved as part of a single access operation may represent a set of bits which are a fragment of a larger piece of information. For example, the metadata bits retrieved as part of a single access operation (e.g., 4 bits) may not have any meaning on their own, but may have meaning when combined with sets of metadata bits retrieved as part of other access operations (e.g., to other memory arrays and/or to the same array at different times).

Memory devices may be packaged together onto a memory module. The memory module may include a number of memory devices, each of which stores data, and one or more error correction memory devices, which may store information used to correct errors when data is read out from the memory. For example, each memory device may have a number of input/output (or DQ) terminals. Each DQ terminal may send or receive a burst of serial data from/to the associated memory. Certain architectures may distribute a relatively small number of bits of metadata to each memory device on the module. For example, as explained in more detail herein, in 10×2p2 memory module with 2 bytes of metadata, if distributed evenly, there may be 2 bits of metadata for each device. As explained in more detail herein, certain amounts of data may more naturally match the architecture of the device, for example based on the number of bit lines in a set activated by a CS signal. When the amount to be stored does not match the architecture of the device, additional steps, such as read/modify/write (RMW) cycles, may be used to protect other information on the device. However, these additional steps may increase a latency of the device during operations, which is undesirable.

The present disclosure is drawn to apparatuses, systems, and methods for alternate die metadata storage. A memory module of the present disclosure may receive a plurality of data bits and an associated plurality of metadata. The plurality of data bits are stored in a plurality of memory devices of the module and the plurality of metadata bits are stored in a portion of the memory devices of the module. In this way, the number of metadata bits stored in each module may be adjusted to allow for easier storage.

In an example embodiment, a memory module may include 8 data memory devices, each of which receives 64 data bits as part of a write operation. As part of that same write operation, four of the memory device may receive 4 bits of metadata each. The metadata may be stored in a column plane activated by a value of a CS signal. The CS signal may access 8 bit lines, however the memory device may use separate write enable signals, such as even and odd write enable signals so that only four bit lines are accessed. In this way the four metadata bits may be written without using additional actions (e.g., a RMW cycle) to protect the other four bits.

FIG. 1 is a block diagram of a memory system according to some embodiments of the present disclosure. The memory system 100 includes a memory module 102 and a controller 150 which operates the memory module 102. The module includes a number of memory devices 104 and 110. The memory devices 104 may be used to store data and may generally be referred to as data memory devices 104, while the memory devices 110 are used to correct errors in data read from the data memory devices 104. The memory devices 110 may be referred to as an error correction memory devices 110. A module logic 112 receives commands and addresses over a command/address C/A bus from the controller 150 through a C/A terminal 114 and distributes those commands and addresses to the memory devices 104 and 110 over internal command and address buses (not shown). Data is communicated between the controller 150 and the module 102 along data buses which couple to data terminals (DQ) terminals 124 of the module 102. The data terminals 124 are organized into pseudo-channels 122 and channels 120. Each channel is a set of data terminals 124 associated with a memory device 104.

FIG. 1 shows an example 10×2p2 memory module 102 which may be used to implement some embodiments of the present disclosure. In the 10×2p2 architecture, there are ten total memory devices 104 and 110. Eight data memory devices 104(0) to 104(7) and two error correction memory devices 110(0) and 110(1). Each channel 120(0) to 120(7) includes one or more pseudo-channels 122, which may be operated independently of each other. In this embodiment, each channel 120 includes two pseudo-channels 122, each of which includes two data terminals 124. Since the memory devices and channels may generally be similar to each other, only a single device 104(0) and its associate channel 120(0) are described in detail herein. In order to simplify the layout of the figure, an arrangement of two rows of four devices 104 each is shown, and their associated channels 120 are shown as stacked boxes. However the representation of FIG. 1 does not necessarily represent the layout of a physical device. For example, a single row of 8 devices 104 may be used. Similarly, various buses and signal lines have been simplified down to a single line for clarity on the drawing, however, multiple physical signal lines may be represented by a single line in the drawing.

During an example write operation, the controller 150 provides a write command and addresses (e.g., row, column, and/or bank addresses as explained in more detail herein) over the C/A terminal 114 to the module 102. The module logic 112 distributes the command and address to the data memory devices 104(0) to 104(7). The controller 150 also provides data to be written along the various DQ channels 120(0) to 120(7). Since the pseudo-channels 122 may be operated independently, we will consider a single pseudo-channel 122 and its two DQ terminals 124. Each data terminal receives a serial burst of bits, which together represent a codeword of data. For example, each terminal receives 32 data bits in series, for a total of 64 data bits per device and 512 bits of data per access operation across the module 102.

The controller 150 may also provide metadata bits. In the described embodiments, two bytes of metadata are provided, associated with the 512 data bits. These metadata bytes are distributed across the data devices 104 of the module. Since there are 8 total data devices 104, there are an average of 2 bits of metadata for each device 104 along with the 64 data bits. For a given write operation, each of the data memory devices 104(0) to 104(7) will receive 64 data bits, while a selected portion of the data memory devices 104(0) to 104(7) will receive metadata bits. For example, all of the data devices 104 may be used to store data for a given write operation, and some but not all of the data memory devices 104 are used to store the metadata for that write operation.

In an example implementation, half of the data devices 104 may be used to store the metadata for a write operation. For example, even or odd memory devices may be used to store the metadata. Other ways of dividing the devices 104 (e.g., devices 0-3 and devices 4-7) may be used in other example embodiments. The controller 150 provides a die selection bit which indicates which memory devices 104 are receiving the metadata bits. For example, the die selection bit may be included as part of a command, such as the write command or may be part of an address, such as a column address. In some embodiments, the die selection bit may also be used as a different selection bit. For example, a column address bit CA10 may be used as both the die select bit and the column plane select bit, as described in more detail herein. Similarly, during a read operation, the controller 150 provides the die select bit to indicate which memory devices 104 to read the metadata from.

During an example write operation, the controller 150 provides data and metadata along with commands, addresses, and a die select bit. A first memory device 104(0) which is selected by the die select bit receives 64 bits of data and 4 bits of metadata along the associated channel 120(0), while a second memory device 104(1) which is not selected by the die select bit receives 64 bits of data and no metadata along the associated channel 120(1). For example, in the active pseudo-channel 122 of the channel 120(0), each of the data terminals 124 receive a burst of 34 bits, 32 data bits and 2 metadata bits. In the active pseudo-channel 122 of the channel 120(1), each of the data terminals 124 receives 32 bits of data as part of a burst.

In some embodiments, to maintain alignment between the selected and non-selected memory devices, both devices 104 may receive bursts of equal length, but the non-selected device receives extra junk bits or filler bits to fill up the clock cycles where the selected device is receiving metadata. The junk or filler bits may represent times (e.g., rising or falling edges of a write clock) where the voltages along the terminals 124 are either ignored (e.g., not latched in an input buffer) or discarded. For example, the junk bits may represent a period where the controller 150 is not driving a particular voltage along the data terminal, where the controller is driving a set voltage (e.g., high or low) or other forms of not providing meaningful information. The non-selected memory device 104(1) may ignore the junk data bits (e.g., by not latching them or by discarding them if latched) while the selected memory device 104(0) is latching the metadata bits. In some embodiments, the burst may be organized so that the data and metadata are sequential (e.g., 32 consecutive data bits and then 2 metadata bits). Other arrangements of the burst may be used in other example embodiments (e.g., metadata first, metadata interspersed among the data bits, etc.). The data is written to locations in the memory array specified by the address in the data memory devices 104.

During an example read operation, the controller 150 provides a read command and addresses along the C/A terminal 114. The controller 150 also provides a die select bit (which may be part of the command or address). The module logic 112 distributes these to the memory devices 104 to 110 and data is read out from the locations specified by the addresses. Metadata is read out from the selected memory devices 104. Each DQ terminal 124 provides 32 bits of read data and either 2 bits of read metadata (in the channel associated with the selected memory device) or two junk bits (in the channel associated with the non-selected memory devices), for a total of 64 data bits per device 104 and 4 bits of metadata per the selected devices 104. The junk bits may represent a period where the memories 104 are not driving a particular voltage along the data terminal, where the memories are driving a set voltage (e.g., high or low) or other forms of not providing meaningful information. The controller 150 may ignore the junk data bits (e.g., by not latching them or by discarding them if latched).

The read and write operations may use a single-access pass to store both the data (as well as parity generated based on the data and metadata) along with the metadata bits. Each memory device may be capable of accessing up to 136 bits in a single access pass (e.g., generally 128 data bits and 8 parity bits). In the 10×2p2 architecture, 64 data bits plus 4 metadata bits are used in the selected devices (along with some number of parity bits, for example 8 parity bits). Accordingly, the data (plus parity) and metadata may all be accessed as a single access pass. For example, as explained in more detail herein, the memory array may be split into two portions, each of which is associated with a value of a column plane select bit in the column address. Data may be stored in the column planes of a selected one of the portions, while the metadata may be stored in one of the column planes of the non-selected portion. One or more bits of the column address may specify which portion of the column planes are selected and which column plan within the non-selected portion is used for the metadata bits.

During an example read operation, the error correction memory devices 110 may be used to identify and correct errors in the data. The error correction memory devices 110 may support correction of the data and metadata in up to one of the data devices 104. The controller 150 may use information stored on the error correction memory device 110 to enable correction of the information after the information is received by the controller 150 during a read operation. For example, the error correction memory device 110 may store repair information (e.g., parity bits) which are associated with the data and metadata read out across all the data devices 104(0) to 104(7), and that parity may be used by a repair circuit (not shown) of the controller 150 to enable correction in the data and metadata of up to one of the devices 104.

In some embodiments, each memory device 104 may also have its own separate error correction, for example an error correction code (ECC) circuit which can repair one or more bits of error in the codeword. For example, each memory 104 may implement single error correction (SEC) and correct up to 1 bit of error in the 66 bits (64 data plus 2 metadata) read out as part of a read command. The ECC circuits in each of the memory devices 104 may generate parity bits when the data/metadata is written, and then may use those parity bits to detect and/or correct errors. The parity bits may generally stay within the devices 104, and not be read out to the controller 150.

Figure 2:
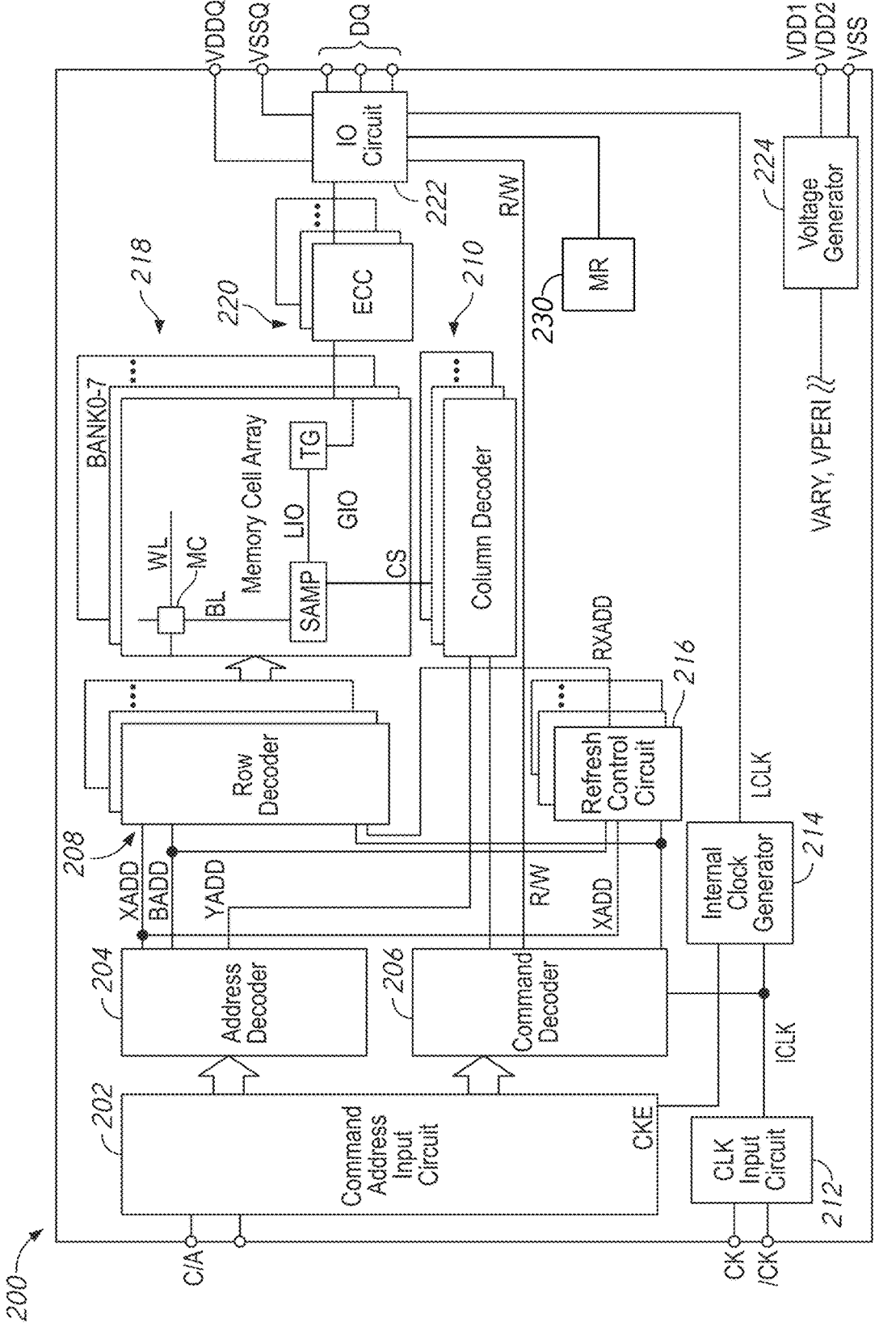
FIG. 2 is a block diagram of a semiconductor device according an embodiment of the disclosure.

FIG. 2 is a block diagram of a semiconductor device according an embodiment of the disclosure. The semiconductor device 200 may be a semiconductor memory device, such as a DRAM device integrated on a single semiconductor chip. For example, the device 100 may implement one of the devices 204 of the module 202 of FIG. 2.

The semiconductor device 200 includes a memory array 218. The memory array 218 is shown as including a plurality of memory banks. In the embodiment of FIG. 2, the memory array 218 is shown as including eight memory banks BANK0-BANK7. More or fewer banks may be included in the memory array 218 of other embodiments.

Each memory bank includes a plurality of word lines WL, a plurality of bit lines BL, and a plurality of memory cells MC arranged at intersections of the plurality of word lines WL and the plurality of bit lines BL. The selection of the word line WL is performed by a row decoder 108 and the selection of the bit lines BL is performed by a column decoder 210. In the embodiment of FIG. 2, the row decoder 208 includes a respective row decoder for each memory bank and the column decoder 210 includes a respective column decoder for each memory bank.

The bit lines BL are coupled to a respective sense amplifier (SAMP). Read data from the bit line BL is amplified by the sense amplifier SAMP, and transferred to an ECC circuit 220 over local data lines (LIO), transfer gate (TG), and global data lines (GIO). Conversely, write data outputted from the ECC circuit 220 is transferred to the sense amplifier SAMP over the complementary main data lines GIO, the transfer gate TG, and the complementary local data lines LIO, and written in the memory cell MC coupled to the bit line BL.

The semiconductor device 200 may employ a plurality of external terminals, such as solder pads, that include command and address (C/A) terminals coupled to a command and address bus to receive commands and addresses, clock terminals to receive clocks CK and/CK, data terminals DQ coupled to a data bus to provide data, and power supply terminals to receive power supply potentials VDD, VSS, VDDQ, and VSSQ. The external terminals may couple directly to the controller (e.g., 150 of FIG. 1) and/or may couple to various buses/connectors of the module (e.g., 102 of FIG. 1).

The clock terminals are supplied with external clocks CK and/CK that are provided to an input circuit 212. The external clocks may be complementary. The input circuit 212 generates an internal clock ICLK based on the CK and/CK clocks. The ICLK clock is provided to the command decoder 206 and to an internal clock generator 214. The internal clock generator 214 provides various internal clocks LCLK based on the ICLK clock. The LCLK clocks may be used for timing operation of various internal circuits. The internal data clocks LCLK are provided to the input/output circuit 222 to time operation of circuits included in the input/output circuit 222, for example, to data receivers to time the receipt of write data. The input/output circuit 222 may include a number of interface connections, each of which may be couplable to one of the DQ pads (e.g., the solder pads which may act as external connections to the device 200).

The C/A terminals may be supplied with memory addresses. The memory addresses supplied to the C/A terminals are transferred, via a command/address input circuit 202, to an address decoder 204. The address decoder 204 receives the address and supplies a decoded row address XADD to the row decoder 208 and supplies a decoded column address YADD to the column decoder 210. The decoded row address XADD may be used to determine which row should be opened, which may cause the data along the bit lines to be read out along the bit lines. The column decoder 210 may provide a column select signal CS, which may be used to determine which sense amplifiers provide data to the LIO. The address decoder 204 may also supply a decoded bank address BADD, which may indicate the bank of the memory array 218 containing the decoded row address XADD and column address YADD.

The C/A terminals may be supplied with commands. Examples of commands include timing commands for controlling the timing of various operations, access commands for accessing the memory, such as read commands for performing read operations and write commands for performing write operations, as well as other commands and operations. The access commands may be associated with one or more row address XADD, column address YADD, and bank address BADD to indicate the memory cell(s) to be accessed.

The commands may be provided as internal command signals to a command decoder 106 via the command/address input circuit 202. The command decoder 206 includes circuits to decode the internal command signals to generate various internal signals and commands for performing operations. For example, the command decoder 206 may provide signals which indicate if data is to be read, written, etc.

The device 200 may receive an access command which is a write command. When the write command is received, and a bank address, a row address and a column address are timely supplied with the write command, write data and metadata supplied to the data terminals DQ by the controller is provided along the data bus and written to memory cells in the memory array 218 corresponding to the row address and column address. The write command is received by the command decoder 206, which provides internal commands so that the write data along with metadata is received by data receivers in the input/output circuit 222. The device 200 also receives a die select signal, such as a die select bit in the column address or in the write command. If the die select signal is active, the I/O circuit 222 may receive write data and metadata. If the die select signal is inactive, the I/O circuit 222 may receive write data alone. For example, the burst along each of the two DQ terminals may be organized as 32 bits of data and then two bits of either metadata or junk data. If the die select signal is active, then the I/O circuit 222 may latch the final two bits from each DQ terminal as metadata bits. If the die select signal is inactive, then the I/O circuit 222 may not latch those bits, or may latch them but then not provide them on to the rest of the memory. Whether the die select bit is active high or active low may be a setting of each device 200, for example stored in the mode register 230 or fuse array.

The write data is supplied via the input/output circuit 222 to the ECC circuit 220 along with the metadata (if applicable). The ECC circuit generates parity bits based on the received data (and metadata) and the ECC circuit 120 provides the data (and metadata) and parity to the memory array 218 to be written along a word line specified by the row address to memory cells specified by the column address.

The device 200 may receive an access command which is a read command. When a read command is received, and a bank address, a row address and a column address are timely supplied with the read command, read data is read from memory cells in the memory array 218 corresponding to the row address and column address. The read command is received by the command decoder 206, which provides internal commands so that read data from the memory array 218 is provided to the ECC circuit 220. Similar to the write operation, a die select bit (e.g., provided with the address or with the read command) may indicate The ECC circuit 220 receives data bits, metadata bits, and parity bits from the array and detects and/or corrects errors in the data and metadata bits. The corrected read data and metadata is provided along the data bus, and the data and metadata are output to outside from the data terminals DQ via the input/output circuit 222. The input/output circuit 222 may use one or more bits of the column address to determine which DQ terminal to provide the metadata along, and may provide junk data along the other DQ terminal (or do nothing with that terminal during those clock cycles, which may also serve as junk data).

The device 200 includes refresh control circuits 216 each associated with a bank of the memory array 218. Each refresh control circuit 216 may determine when to perform a refresh operation on the associated bank. The refresh control circuit 216 provides a refresh address RXADD (along with one or more refresh signals, not shown in FIG. 1). The row decoder 208 performs a refresh operation on one or more word lines associated with RXADD. The refresh control circuit 216 may perform multiple types of refresh operation, which may determine how the address RXADD is generated, as well as other details such as how many word lines are associated with the address RXADD.

The ECC circuit 220 may detect and/or correct errors in the accessed data. As part of a write operation, the ECC circuit 220 may receive bits from the IO circuit 222 and generate parity bits based on those received bits. The received bits and parity bits are written to the memory array 218. During an example read operation, the ECC circuit 220 receives a set of bits and their associated parity bits from the array 218 and uses them to locate and/or correct errors. For example, in a single error correction (SEC) scheme, up to one bit of error may be located and detected. In a single error correction double error detection (SECDED) scheme, up to one bit of error may be corrected, but two errors may be detected (although the bits causing those errors are not individually located, so no correction can be made). The ECC circuit 220 may correct the information and then provide the corrected information (and/or a signal indicated detected errors) to the IO circuit 222. The parity bits may generally not be provided to the IO circuit 222.

The mode register 230 may include various settings, and may be used to enable a metadata mode of the memory 200. When metadata is enabled, the device 200 may store metadata which is associated with the data. For example, as part of a write operation the controller may provide data along with its associated metadata, and as part of a read operation may receive data and its associated metadata. The mode register 230 (and/or some other setting register of the memory 200) may specify if the memory device 200 handles metadata when the die select bit is a logical high or when the die select bit is a logical low (e.g., is the die select bit active high or active low). By putting this setting in a different state in different dice of the memory module, it is possible to control which memory devices and how many handle metadata with each state of the die select bit. For example, the module may have even memory devices set to the die select bit active low and odd memory devices set to the die select bit being active high.

The memory 200 may be operated in various modes based on a number of the DQ pads which are used. In some embodiments, the mode register 230 may include settings which determine how many DQ pads are used, even if there are more DQ pads available. The mode may determine both how many DQ pads the controller expects to send/receive data along, as well as the format and/or number of bits which the controller expects as part of a single access command. For example, the memory may have 16 physical DQ pads. In a 2p2 mode, four of those DQ pads are used, divided into two pseudo-channels of two DQ pads each. The mode may also determine a burst length at each DQ terminal as part of a DQ operation. The burst length represents a number of serial bits at each DQ terminal during an access operation. For example, in the 2p2 mode, each data terminal may receive a burst of 32 data bits plus some number of metadata bits. When two bytes of metadata are enabled, then the burst length may be 34 along each terminal.

The power supply terminals are supplied with power supply potentials VDD and VSS. The power supply potentials VDD and VSS are supplied to an internal voltage generator circuit 224. The internal voltage generator circuit 224 generates various internal potentials VARY, and the like based on the power supply potentials VDD and VSS supplied to the power supply terminals.

The power supply terminals are also supplied with power supply potentials VDDQ and VSSQ. The power supply potentials VDDQ and VSSQ are supplied to the input/output circuit 222. The power supply potentials VDDQ and VSSQ supplied to the power supply terminals may be the same potentials as the power supply potentials VDD and VSS supplied to the power supply terminals in an embodiment of the disclosure. The power supply potentials VDDQ and VSSQ supplied to the power supply terminals may be different potentials from the power supply potentials VDD and VSS supplied to the power supply terminals in another embodiment of the disclosure. The power supply potentials VDDQ and VSSQ supplied to the power supply terminals are used for the input/output circuit 122 so that power supply noise generated by the input/output circuit 122 does not propagate to the other circuit blocks.

Figure 3:
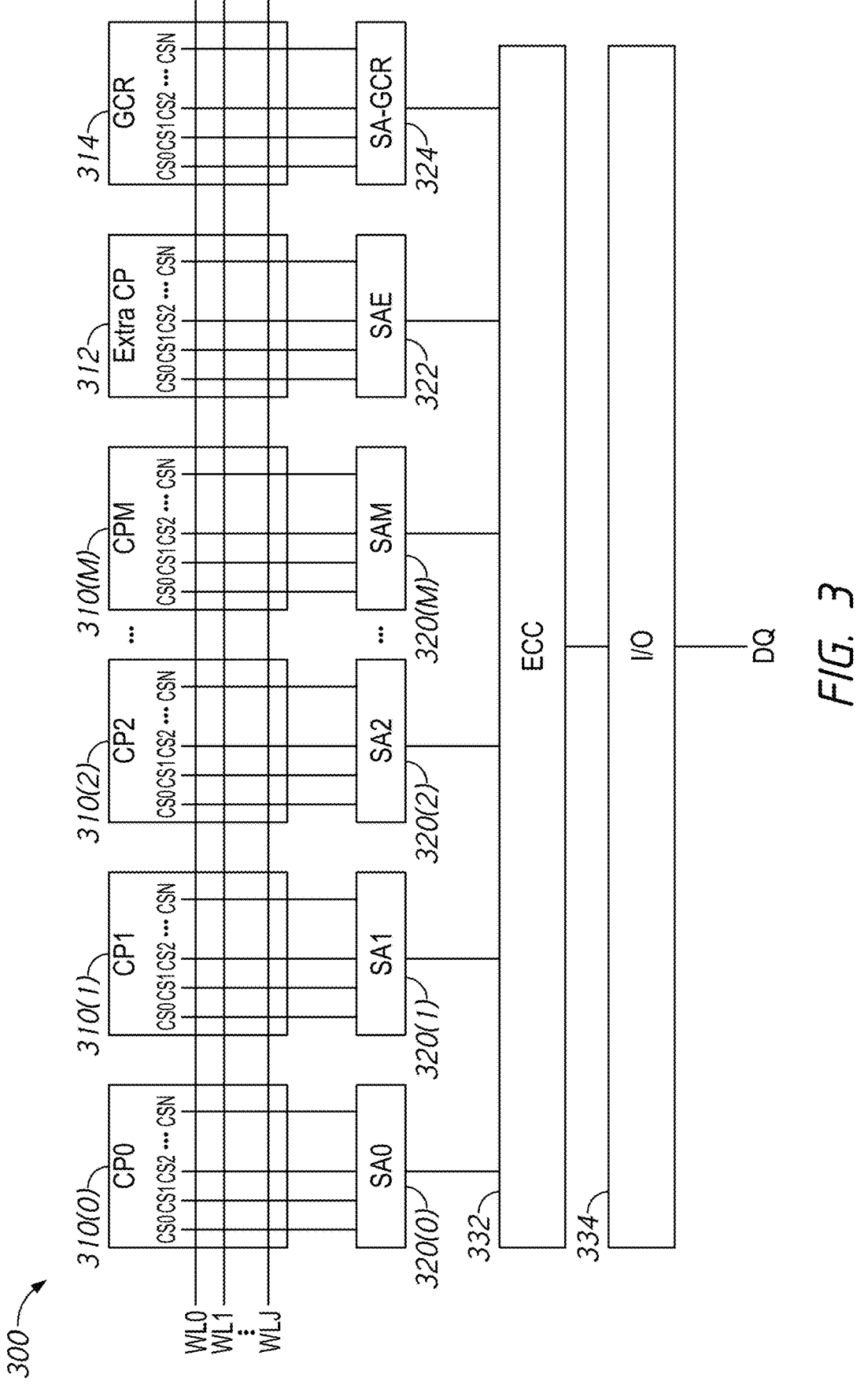
FIG. 3 is a block diagram of a memory device according to some embodiments of the present disclosure.

FIG. 3 is a block diagram of a memory device according to some embodiments of the present disclosure. The memory device 300 may, in some embodiments, represent a portion of the memory device 200 of FIG. 2. The view of FIG. 3 shows a portion of a memory array 310-314 and 320-324 which may be part of a memory bank (e.g., 218 of FIG. 2) along with selected circuits used in the data path such as the ECC circuit 332 (e.g., 220 of FIG. 2) and IO circuits 334

(e.g., 222 of FIG. 2). For clarity certain circuits and signals have been omitted from the view of FIG. 3.

The memory device 300 is organized into a number of column planes 310-314. Each of the column planes represents a portion of a memory bank. Each column plane 310-314 includes a number of memory cells at the intersection of word lines WL and bit lines. The bit lines may be grouped together into sets which are activated by a value of a column select (CS) signal. For the sake of clarity, only a single vertical line is used to represent the bit lines of each column select set, however, there may be multiple columns accessed by that value of CS. For example, each line may represent 8 bit lines, all accessed in common by a value of CS. As used herein, a 'value' of CS may refer to a decoded signal provided to sets of bit lines. So a first value may represent a first value of a multibit CS signal, or after decoding a signal line associated with that value being active. The word lines may be extend across multiple of the column planes 310-314.

The memory 300 includes a set of data column planes 310 as well as an extra column plane 312. The extra column plane 312 may be used to store additional information, such as error correction parity bits or metadata bits.

In some embodiments, the memory 300 may also include an optional global column redundancy (GCR) column plane 314. In some embodiments, the GCR plane 314 may have fewer memory cells (e.g., fewer column select groups) than the data column planes 310. The GCR CP 314 includes a number of redundant columns which may be used as part of a repair operation. If a value of the CS signal is identified as including defective memory cells in one of the data column planes 310, then the memory may be remapped such that the data which would have been stored in that column plane for that value of CS is instead stored in the GCR CP 314.

In an example embodiment, the memory 310 may include 16 data column planes 310(0)-310(15). Each of those data column planes 310 includes 64 sets of column selects activated by a value of the column select signal, and each set of column select includes 8 bit lines. Accordingly, when a word line is opened responsive to a row address, and a column select signal is provided to each of the 16 column planes then 8 bits are accessed from each of the 16 column planes for a total of 128 bits. A column select signal is also provided to the extra column plane 312, although that column select signal may be a different value than the one provided to the data column planes 310 for an additional 8 bits. If a repair has been performed, the GCR CP 314 may also be accessed and the value on a GCR LIO may be used while ignoring the LIO of the column plane it is replacing. Accordingly, the maximum number of bits that can be retrieved as part of an access pass is 128 bits from the data column planes 310 (with 8 bits substituted from the GCR CP 314 if there has been a repair) along with 8 additional bits from the extra CP 312.

In the 2p2 architecture, fewer than 128 bits of data are accessed for a given access operation. Accordingly, only a portion of the data column planes 310 may be used to send/receive data. The column address may include a column plane select bit or bits which are used to determine which portion of the data column planes 310 are used. For example, the data column planes 310 may be split into two sets of eight data column planes each. A bit of the column address (e.g., CA10) may be used as the column plane select bit and may choose which set of data column planes is being used as part of the current access operation. In some embodiments, a different bit of the column address, such as CA9, may be used as the die select bit. In some embodiments, the column plane select bit may also act as the die select bit (e.g., CA10 may be both the die select bit and the column plane select bit).

As described in more detail herein, during a given access operation, data may be stored in the portion of the column planes selected by the column plane select bit, while metadata (and in some cases parity) may be stored in one or more of the non-selected column planes. For example, the data may be stored in each column plane of the selected portion (e.g., 8 bits in each of 8 selected data column planes 310 for a total of 64 data bits). The metadata may be stored in one of the column planes in the non-selected portion. For example, if the column plane select bit selects even data column planes, then the metadata may be stored in one of the odd column planes. In the example embodiment with 2 bytes of metadata enabled where the die is selected by the die select bit, the 4 bits of metadata may be stored in four memory cells in the chosen odd column plane.

In some embodiments of the 9×2p2 architecture of the present disclosure, the parity bits may be store either in the extra column plane 312 or in one of the non-selected column planes. In an example implementation, each set of 64 data bits may be associated with 8 bits of parity generated by the ECC circuit 332. However, the extra column plane 312 may not have space for all of the parity bits. Accordingly, some parity bits may be stored in the extra column plane 312 and some may be stored in the non-selected data column planes 310 similar to the metadata (although the metadata and parity may be stored in different non-selected column planes for a given set of data bits).

In an example write operation, a controller (e.g., 150 of FIG. 1) provides data and metadata to the memory device which are written as part of a single access pass. In the example embodiment discussed herein, 64 bits of data are provided along with 4 bits of metadata if the device 300 is selected by the die select bit, such that each of the two DQ terminals per pseudo-channel receives a burst length of 34 (32 data bits and 2 bits of metadata). The data and metadata is provided to the ECC circuit 332 which generates a set of parity bits based on the data and metadata bits. For example 8 parity bits may be generated based on the 64 data bits and 4 metadata bits. Based on the column address half of the data column planes 310 may be selected and the column decoder may provide a first value of the CS signal to the selected half of the column planes and provide a second value of the CS signal to the non-selected half of the column planes.

The data may be written to the memory cells at the intersection of the active word line and the bit lines selected by the first value of CS in the selected half of the column planes 310. The metadata may be written to the memory cells at the intersection of the active word line and the bit lines selected by the second value of CS in a selected one of the non-selected half of the column planes. Depending on the column address, the parity bits may either be written to the memory cells at the intersection of the word line and the bit lines selected by a CS signal (which may be the first CS value or a different value) in the extra column plane 312, or they may be written to the memory cells at the intersection of the word line and the bit lines selected by a third value of the CS signal in one of the non-selected column planes.

In some embodiments, since 8 bit lines are activated by each CS value, and there are 4 metadata bits written, it may be useful to protect the remaining 4 bits associated with that value of CS in that column plane so they are not erroneously overwritten. Separate write enable signals may be used such that only some of the sense amplifiers associated with the CS value are modified at one time (rather than all 8). For example, only the sense amplifiers associated with the 4 bitlines which will store the new metadata bits may be activated. This may prevent the data on the bit lines coupled to the non-related sense amplifiers from being modified without requiring additional operations (e.g., a read/modify/write cycle). Other options for protecting the non-accessed bits associated with the CS signal may be used in other example embodiments.

In an example layout, the memory cells of the array may be divided into sections (or mats), with gaps in between, and the sense amplifiers may be positioned in those gaps. The sense amplifiers are coupled to bit lines in the adjacent sections, one of which is activated and one of which acts as a reference. Each gap includes sense amplifiers coupled to either the even or the odd bit lines in the adjacent memory cell sections. A first write enable signal may activate the sense amplifiers in a first gap, while a second write enable signal may activate the sense amplifiers in a second gap. For example an even write enable signal may activate even sense amplifiers while an odd write enable signal may activate odd sense amplifiers. During read operations, a common read enable signal may be used for both gaps, as data is not overwritten during a read operation, and the extra 4 bits do not need as much protection as during a write operation.

In an example read operation, the data, metadata, and parity are retrieved as part of a single access pass when the die select bit is active. For example, the second CS value is provided by the column decoder to the selected locations in the non-selected portion of the column planes 310 and the metadata is retrieved from column plane it was saved in. As part of the same access, the column decoder provides the first CS signal to the selected portion of the column planes 310 and the data bits are read from the column planes 310. The parity is retrieved either from the extra column plane 312 based on the first CS signal, or from another one of the non-selected column planes based on the third CS signal value. The data (e.g., 64 bits), metadata (e.g. 4 bits) and parity (e.g., 8 bits) are provided to the ECC circuit 332 which performs error correction on the data and metadata based on the received bits. For example, the ECC circuit 332 may perform single error correction (SEC) where up to one bit of error in the data and metadata is located and corrected. Other types of error correction such as single error correction, double error detection (SECDED) may also be used. The corrected data bits and the corrected metadata (e.g., 4 bits) are provided to the I/O circuit 334, where they provided to the DQ terminals.

When the die select bit is inactive, the read and write operations may generally be similar, except that no metadata is written or read. For example, when the die select bit is inactive, the 64 data bits may be used by the ECC circuit 332 to generate parity bits and the data and parity may be stored in the selected portion of the data column planes 310 and the extra CP 312 based on the column plane select bit. Similarly, during a read, the data and parity are read out to the ECC circuit 332 and the corrected read data is provided to the I/O circuit 334.

Figure 4:
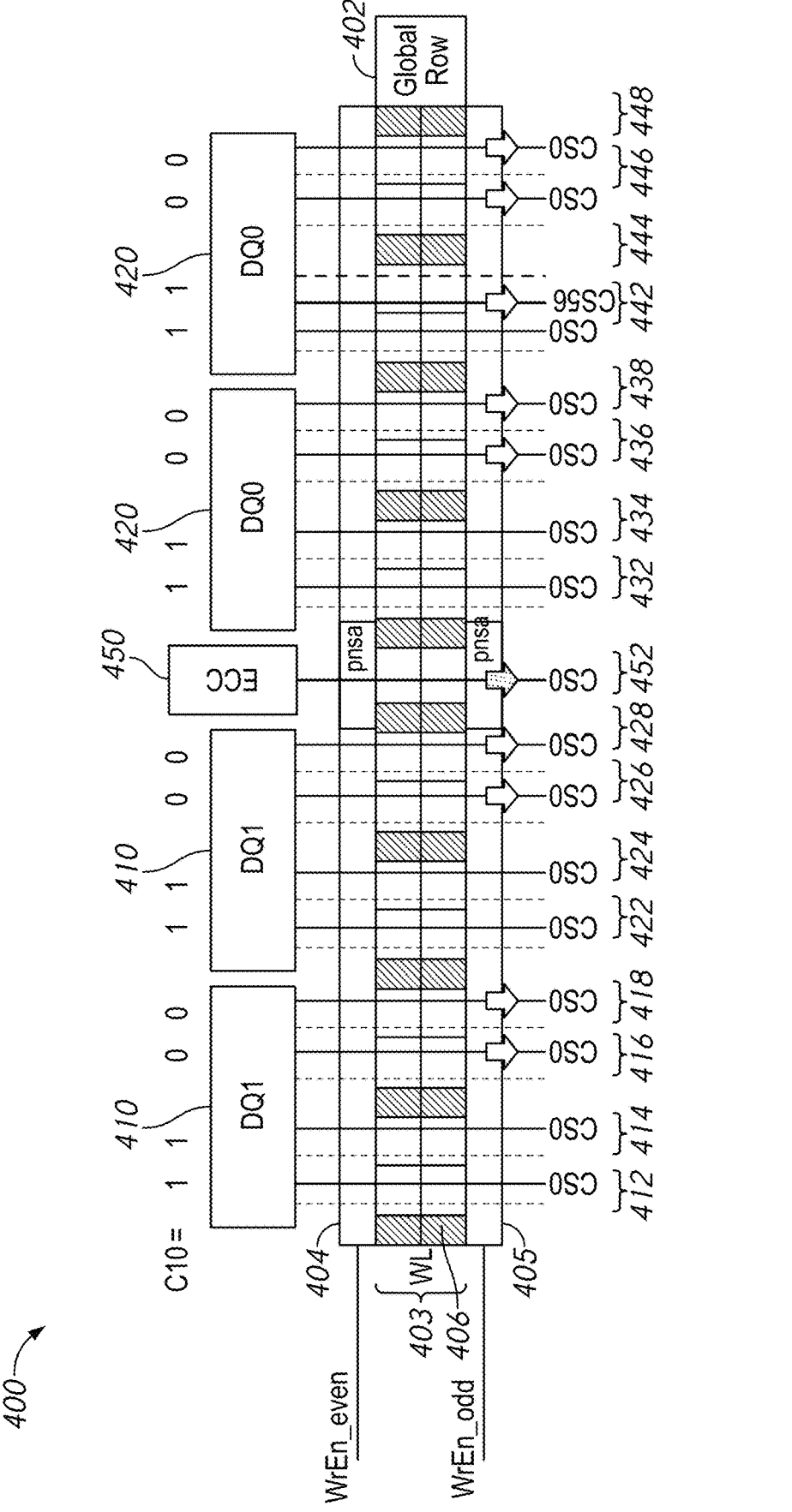
FIG. 4 is a schematic diagram of a portion of a memory bank according to some embodiments of the present disclosure.

FIG. 4 is a schematic diagram of a portion of a memory bank according to some embodiments of the present disclosure. The memory bank 400 may, in some embodiments, be included in the memory system 100 of FIG. 1, memory device 200 of FIG. 20, and/or 300 of FIG. 3. The memory bank 400 shows a simplified schematic view of a layout of memory bank along with example signals which may be used to activate various columns in the column planes as part of access operations to a memory device in a 2p2 memory module, such as the devices 104 and 110 of the memory module 102 of FIG. 1.

Similar to FIG. 3, FIG. 4 is described with respect to an example embodiment where there are 16 data column planes (e.g., 310 of FIG. 3), each of which includes 64 sets of bit lines (e.g., 64 values of the CS signal) each of which provides up to 8 bits of data when activated (e.g., coupled to the LIOs) by the respective CS signal. It should be understood that this is one example implementation of the present disclosure, and that other arrangements may be used in other example embodiments (e.g., more or fewer CS sets per CP, more or fewer CP's per memory bank, etc.).

The memory bank 400 shows a memory organized into sixteen column planes 412-448 (e.g., 310 of FIG. 3), each of which is associated with a DQ pad 410-420. So a first DQ pad 410 is associated with column planes 412-428, and a second DQ pad 420 is associated with column planes 428-448. In the example 2p2 mode of FIG. 4, each of the two DQ pads 410 and 440 handles 32 data bits as part of an access operation, for a total of 64 data bits. The memory back may also receive metadata which may be stored in the array 400 when the device is selected by the die select bit. Parity bits are stored in an extra column plane 452 (e.g., 312 of FIG. 3) coupled to the ECC circuit 450 (e.g., 220 of FIGS. 2 and/or 332 of FIG. 3). In the simplified view of FIG. 4, a single word line WL is shown, along with a global row decoder 402 which drives the word line. Similarly, only selected lines are shown for the bit lines, each of which represents a set of bit lines activated by a common CS signal in that CP.

The memory bank 400 is organized in sections or mats 403 with the cells of the memory array between two sense amplifier regions 404 and 405. There may be a number of sections each with a number of word lines and bit lines in each column plane, however for the sake of clarity only a single section 403 is shown in FIG. 4. The sense amplifier regions 404 may be elongated in a same direction as the word line WL. The different sections may extend in a direction perpendicular to the direction the word line is elongated in. Each section may be separated by sense amplifier regions (e.g., 404-409). The sense amplifiers in each of the region may be coupled to a bit line in the section and a bit line in the adjacent section. The sense amplifiers in each section 404 and 405 may be coupled to either even or odd bit lines in the adjacent mats 403. During an access operation, the bit line in the section that includes the active word line may be accessed while the bit line which extends into the non-accessed section may act as a reference. During a write operation, the sense amplifier sections 404 and 405 may be activated (e.g., be coupled to the GIOs) responsive to a write enable signals WrEn_even and WrEn_odd respectively. The write enable signals may be separately activated to activate a first half or a second half of bit lines in each column plane 412-448.

The column planes 412-448 in the section 403 are separated by sub word line (SWL) drivers 406. Each column plane is adjacent to one other column plane and to a SWL driver 406. For example, the column plane 412 is adjacent to a SWL driver 406 on one side and to the column plane 414 on the other side. The column plane 414 is adjacent to the column plane 412 on a first side and to a second SWL driver 406 on the opposite side. On the opposite side of that SWL driver 406 is another column plane 416 and so forth.

Different column planes are accessed based on a column plane select bit, in this case the bit CA10 of the column address. For each DQ terminal 410 and 420, half of the column planes are active for each state of CA10. Accordingly, the column planes 412, 414, 422, 424, 432, 434, 442, and 444 all contain data which is accessed when C10=1 and the column planes 416, 418, 426, 428, 436, 438, 446, and 448 all contain data which is accessed when C10=0. Whichever set of column planes is selected by C10, one or more column planes of the other set may be used to store the metadata bits.

FIG. 4 shows an example access operation, such as a write operation. The section or mat 403 is bordered on either side by a first sense amplifier region 404 and a second sense amplifier region 405. Each sense amplifier region 404 and 405 receives a column select signal as well as a respective write enable signal WrEn_even and WrEn_odd.

In the example write operation, the memory device receives a column address which includes C10=0 and which has a value that decoders to the first column select signal value CS0. Accordingly, CS0 is provided by the column decoder to the column planes 416, 418, 426, 428, 436, 438, 446, and 448 along with the write enable signals WrEn_even and WrEn_odd, and the bit lines associated with CS0 in each of those column planes each receive 8 bits of data, four bits for each column plane from each of the sense amplifier regions 404 and 405. The column decoder also provides CS0 to the extra column plane 452, and the ECC circuit 450 writes 8 bits of parity to the memory cells at the intersection of the word line and the bit lines activated by CS0 and WrEn_even and WrEn_odd in the extra column plane 452.

In addition, the column decoder also generates an additional CS signal and provides it to one of the column planes which was not selected by the value of C10. In this example embodiment, a value CS56 is provided to the column plane 444 (which is associated with CA10=1). The column decoder also provides WrEn_even or WrEn_odd, but not both to the column plane 442. In this example, WrEn_even is provided, and four metadata bits are written to the memory cells at the intersection of the bit lines in the column plane 442 which are associated with CS56 and the bitlines coupled to the even sense amplifier set 404.

In this manner, from a single access pass, 64 bits of data (8 each from column planes 416, 418, 426, 428, 436, 438, 446, and 448), 4 bits of metadata (in column plane 442) and 8 bits of parity (from extra column plane 452) are written in a single pass. Since the write enable signal was only provided for the bit lines which were being written to, the data stored along the odd bit lines in column plane 442 CS56 are protected from any inadvertent alteration. The arrows are used to show which CS signals and which column planes are accessed as part of a single access pass.

Figure 5:
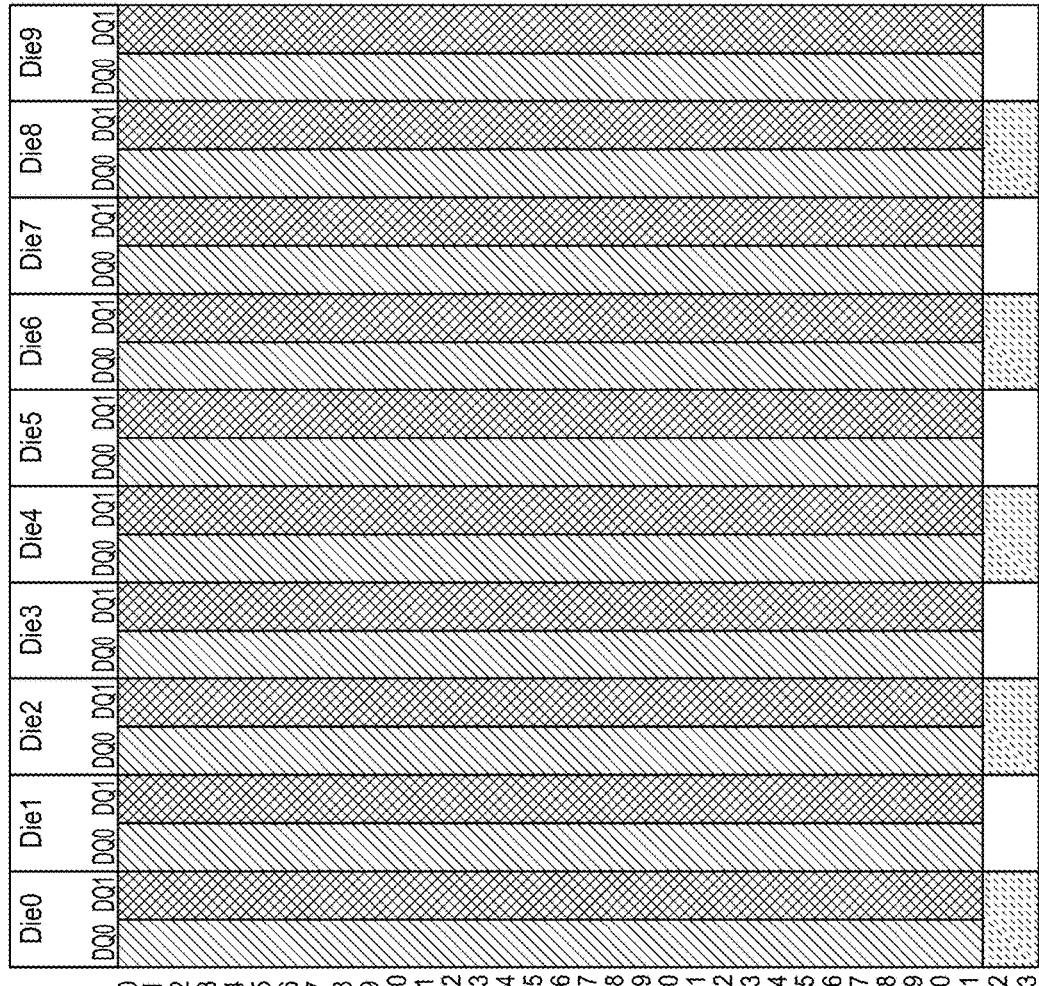
FIG. 5 is a chart of data bursts in a memory module according to some embodiments of the present disclosure.
Figure 5:

FIG. 5 is a chart of data bursts in a memory module according to some embodiments of the present disclosure. The chart 500 represents data provided along data terminals of a number of memory devices in an example memory module. For example, the chart 500 may represent the operation of the memory module 100 of FIG. 1.

The chart 500 shows bursts of data bits and metadata bits in a 10×2p2 memory device. Accordingly, each device, here labelled as Die 0 to Die 9 has two DQ channels DQ0 and DQ1, represented by the columns of the chart 500. The rows of the chart 400 show data and metadata in a burst length sent/received along those DQ terminals for an example operation. The example chart 500 shows Die 0 to Die 7, which may be the 8 data dice (e.g., 104 of FIG. 1) and Die 8 and Die 9, which may be error correction dice (e.g., 110 of FIG. 1). In the example embodiment of the chart 400, the die select bit has selected even dice (e.g., Die 0, Die 2, Die 4, Die 6, and Die 8) to store the metadata bits. For example, this may be represented by the die select bit at a logical low. If the die select bit was in the other state (e.g., a logical high) then the odd dice (e.g., Die 1, Die 3, Die 5, Die 7 and Die 9) may be selected for storing metadata.

Each of the memory devices receives 32 bits of data long each of their two DQ terminals, for a total of 64 bits of data for each of the devices. The selected devices (e.g., the even devices) also receive metadata. In the embodiment of FIG. 4, the burst is organized with 32 consecutive bits of data then two bits of metadata along both data terminals of the selected die (e.g., 64 data bits and 4 metadata bits). The non-selected die receive 32 bits of data along each DQ terminal and then junk bits during the time period (e.g., the write clock edges) when metadata is being received with the selected devices.

Figure 6:
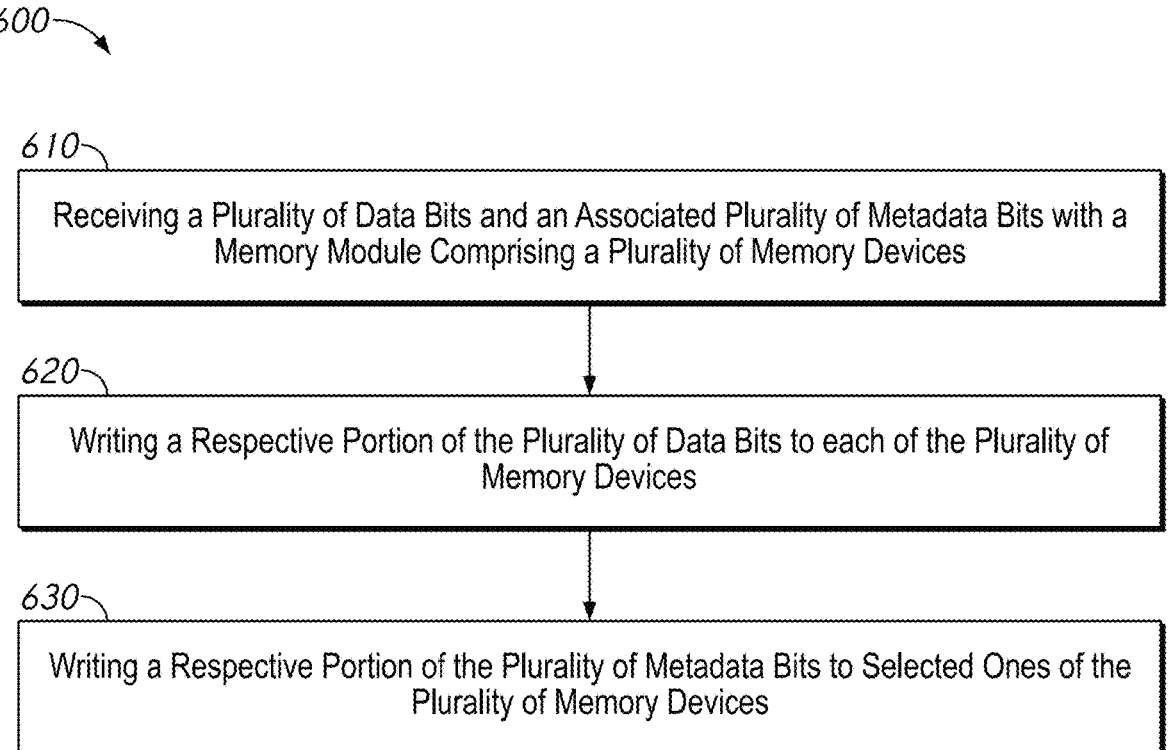
FIG. 6 is a flow chart of a method according to some embodiments of the present disclosure.

FIG. 6 is a flow chart of a method according to some embodiments of the present disclosure. The method 600 may be implemented on one or more of the apparatuses and systems described herein. For example, the method 600 may be implemented by memory system 100 of FIG. 1, the memory device 200 of FIG. 2, 300 of FIG. 3, and/or 400 of FIG. 4. The method 600 may describe a method of writing data and metadata to a memory module.

The method 600 may generally begin with box 610, which describes receiving a plurality of data bits and an associated plurality of metadata bits with a memory module comprising a plurality of memory devices. For example, a controller such as the controller 150 of FIG. 1, provides the data and metadata along the channels associated with the memory devices. The controller may also provide commands and addresses such as row and column addresses and a write command.

Box 610 may generally be followed by box 620, which describes writing a respective portion of the plurality of data bits to each of the plurality of memory devices. Box 620 may generally happen along with box 630, which describes writing a respective portion of the plurality of metadata bits to selected ones of the plurality of memory devices. For example, 64 data bits may be written to each of the memory devices, while 4 metadata bits may be written to the selected ones of the memory devices.

The method 600 may include selecting the selected ones of the plurality of memory devices based on die select bit. The controller may provide the die select bit. For example, the method 600 may include providing a write command and a column address from a controller to the memory module, wherein the write command or the column address includes the die select bit. The method 600 may also include selectively activating a first write enable signal or a second write enable signal in each of the selected ones of the plurality of memory devices and writing the respective portion of the plurality of metadata bits to bit lines in the each of the selected ones of the plurality of memory devices based on the first write enable signal or the second write enable signal.

The method 600 may also include selecting a portion of a plurality of column planes in each of the selected ones of the plurality of memory devices and writing the respective portion of the plurality of data to the selected portion of the plurality of column planes and writing the respective portion of the plurality of metadata bits to the non-selected portion of the plurality of the plurality of column planes.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above-discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. An apparatus comprising:
 a plurality of memory devices; and
 a controller, wherein the controller is configured to provide a plurality of data bits and a plurality of metadata bits as part of a write operation, wherein each of the plurality of memory devices receives a respective portion of the plurality of data bits and a selected portion of the plurality of memory devices receives a respective portion of the plurality of metadata bits, wherein the selected portion comprises less than all of the plurality of memory devices.

2. The apparatus of claim 1, wherein the selected portion of the plurality of memory devices comprises even ones of the plurality of memory devices or the selected portion of the plurality of memory devices comprises odd ones of the plurality of memory devices.

3. The apparatus of claim 1, wherein the controller is configured to provide a die select bit and wherein each of the plurality of memory devices includes a setting register configured to determine if the memory device is selected based on a state of the die select bit.

4. The apparatus of claim 3, wherein the controller is configured to provide the die select bit in a column address or a write command.

5. The apparatus of claim 1, further comprising a memory module which includes the plurality of memory devices.

6. The apparatus of claim 5, wherein the memory module is a 10×2p2 module.

7. The apparatus of claim 1, wherein each of the plurality of memory devices includes a column plane comprising a plurality of bit lines selected by a column select signal, and wherein the respective portion of the plurality of metadata bits are stored in a first portion of the plurality of bit lines activated by a first write enable signal or a second portion of the plurality of bit lines activated by a second write enable signal.

8. A method comprising:
 receiving a plurality of data bits and an associated plurality of metadata bits with a memory module comprising a plurality of memory devices;
 writing a respective portion of the plurality of data bits to each of the plurality of memory devices; and
 writing a respective portion of the plurality of metadata bits to selected ones of the plurality of memory devices, wherein the selected ones comprises less than all of the plurality of memory devices.

9. The method of claim 8, further comprising selecting the selected ones of the plurality of memory devices based on die select bit.

10. The method of claim 9, further comprising providing a write command and a column address from a controller to the memory module, wherein the write command or the column address includes the die select bit.

11. The method of claim 8, further comprising:

selectively activating a first write enable signal or a second write enable signal in each of the selected ones of the plurality of memory devices; and writing the respective portion of the plurality of metadata bits to bit lines in the each of the selected ones of the plurality of memory devices based on the first write enable signal or the second write enable signal.

12. The method of claim 8, further comprising:

selecting a portion of a plurality of column planes in each of the selected ones of the plurality of memory devices and writing the respective portion of the plurality of data to the selected portion of the plurality of column planes; and writing the respective portion of the plurality of metadata bits to the non-selected portion of the plurality of the plurality of column planes.

13. The method of claim 8, wherein the memory module is a 10×2p2 memory module.

14. The method of claim 8, further comprising:

receiving the plurality of data bits along a plurality of data channels of the memory module; and receiving the plurality of metadata bits along a selected portion of the plurality of data channels.

15. An apparatus comprising:

a first memory device;

a second memory device; and a module logic circuit configured to provide a read command to the first memory device and the second memory device, wherein responsive to the read command the first memory device is configured to provide a first portion of a plurality of data bits and the second memory device is configured to provide a second portion of a plurality of data bits and a selected one of the first memory device or the second memory device is configured to provide a plurality of metadata bits associated with the plurality of data bits.

16. The apparatus of claim 15, wherein the module logic circuit is configured to receive a die select signal which selects the first memory device or the second memory device.

17. The apparatus of claim 15, wherein the first memory device includes a first plurality of column planes and the second memory device includes a second plurality of column planes, wherein the first memory device is configured to read the first portion of the plurality of data bits from a selected first portion or second portion of the first plurality of column planes, and wherein the second memory device is configured to read the second portion of the plurality of data bits from a selected first portion or second portion of the second plurality of column planes.

18. The apparatus of claim 17, wherein the selected one of the first memory device or the second memory device is configured to read the plurality of metadata bits from a non-selected first portion or second portion of the first or the second plurality of column planes respectively.

19. The apparatus of claim 15, further comprising:

a first data channel associated with the first memory device; and a second data channel associated with the second memory device, wherein the first portion of the plurality of data bits is provided as a burst along terminals of the first data channel, wherein the second portion of the plurality of data bits is provided as a burst along terminals of the second data channel, and wherein the plurality of metadata bits is provided as part of the burst along the first data channel or the second data channel associated with the selected one of the first memory device or the second memory device.

20. The apparatus of claim 15, wherein the first memory device, the second memory device, and the module logic circuit are part of a memory module.

21. An apparatus comprising:

a memory module comprising a plurality of memory devices, wherein the memory module is a 10×2p2 memory module; and a controller, wherein the controller is configured to provide a plurality of data bits and a plurality of metadata bits as part of a write operation, wherein each of the plurality of memory devices receives a respective portion of the plurality of data bits and a selected portion of the plurality of memory devices receives a respective portion of the plurality of metadata bits.

22. A method comprising:

receiving a plurality of data bits and an associated plurality of metadata bits with a memory module comprising a plurality of memory devices, wherein the memory module is a 10×2p2 memory module;

writing a respective portion of the plurality of data bits to each of the plurality of memory devices; and writing a respective portion of the plurality of metadata bits to selected ones of the plurality of memory devices.

* * * * *